United States Patent [19]  [11] Patent Number: 4,726,854
Olson et al.  [45] Date of Patent: * Feb. 23, 1988

[54] CAST IRON WELDING ELECTRODES

[75] Inventors: David L. Olson, Golden, Colo.;
Alfredo D. Marquez, Caracas,
Venezuela

[73] Assignee: Research Corporation, New York, N.Y.

[*] Notice: The portion of the term of this patent subsequent to Aug. 13, 2002 has been disclaimed.

[21] Appl. No.: 762,664

[22] Filed: Aug. 5, 1985

Related U.S. Application Data

[63] Continuation-in-part of Ser. No. 442,172, Nov. 16, 1982, Pat. No. 4,534,793.

[51] Int. Cl.[4] .............................................. B23K 35/22
[52] U.S. Cl. .................... 148/24; 219/145.22; 219/145.23; 219/146.23; 219/146.41
[58] Field of Search ............... 219/145.22, 145.23, 219/146.23, 146.41; 420/9, 73, 58; 148/24

[56] References Cited

U.S. PATENT DOCUMENTS

| | | | |
|---|---|---|---|
| 1,561,306 | 11/1925 | Brach . | |
| 1,815,464 | 7/1931 | Fahrenwald . | |
| 2,111,278 | 3/1938 | Charlton | 75/125 |
| 2,156,306 | 5/1939 | Rapatz | 113/112 |
| 2,184,518 | 12/1939 | Eash et al. . | |
| 2,266,762 | 12/1941 | Jerabek | 219/8 |
| 2,313,420 | 3/1943 | Cape | 75/128. |
| 2,355,271 | 8/1944 | Cape | 75/128 |
| 2,457,215 | 12/1948 | Eash | 219/8 |
| 2,662,011 | 12/1953 | Gagnebin et al. . | |
| 2,706,696 | 4/1955 | Payson | 148/31 |
| 2,709,132 | 5/1955 | Giles | 75/128 |
| 2,802,756 | 8/1957 | Bloom | 117/207 |
| 2,815,280 | 12/1957 | Clarke, Jr. . | |
| 2,875,104 | 2/1959 | Bergh et al. | 117/205 |
| 3,231,709 | 1/1966 | Foley, Jr. | 219/76 |
| 3,250,612 | 5/1966 | Roy | 75/126 |
| 3,266,876 | 8/1966 | DeLong | 75/123 K |
| 3,334,996 | 8/1967 | Foster | 75/126 |
| 3,556,777 | 1/1971 | Petry | 75/126 |
| 3,660,080 | 5/1972 | Espy et al. | 75/128 |
| 3,663,214 | 5/1972 | Moore et al. | 75/126 |
| 3,740,212 | 6/1973 | Church | 75/128 |
| 3,851,142 | 11/1974 | Bishel | 219/146 |
| 3,859,083 | 1/1975 | Kusaka et al. | 75/128 |
| 3,901,690 | 8/1975 | Philip et al. | 75/123 |
| 3,986,867 | 10/1976 | Masumoto et al. | 75/126 |
| 4,043,843 | 8/1977 | Tanczyn | 148/37 |
| 4,087,673 | 5/1978 | Kiilunen | 219/137 |
| 4,122,817 | 10/1978 | Matlock | 123/188 |
| 4,534,793 | 8/1985 | Olson et al. | 219/146.23 |

*Primary Examiner*—Melvyn J. Andrews
*Attorney, Agent, or Firm*—Scully, Scott, Murphy & Presser

[57] ABSTRACT

Metal filler compositions based on manganese and nickel for the welding of cast iron are disclosed. The filler composition preferably contains about 15 to 50% manganese and 15 to 35% nickel. The filler compositions may be incorporated into a welding rod for Shielded Metal Arc (SMA) or into the welding wire for Gas Metal Arc (GMA) welding or added as metal powders in Flux Cored Arc (FCA) or submerged Arc (SA) welding. The compositions are particularly useful for welding gray and ductile (nodular) cast irons.

9 Claims, 10 Drawing Figures

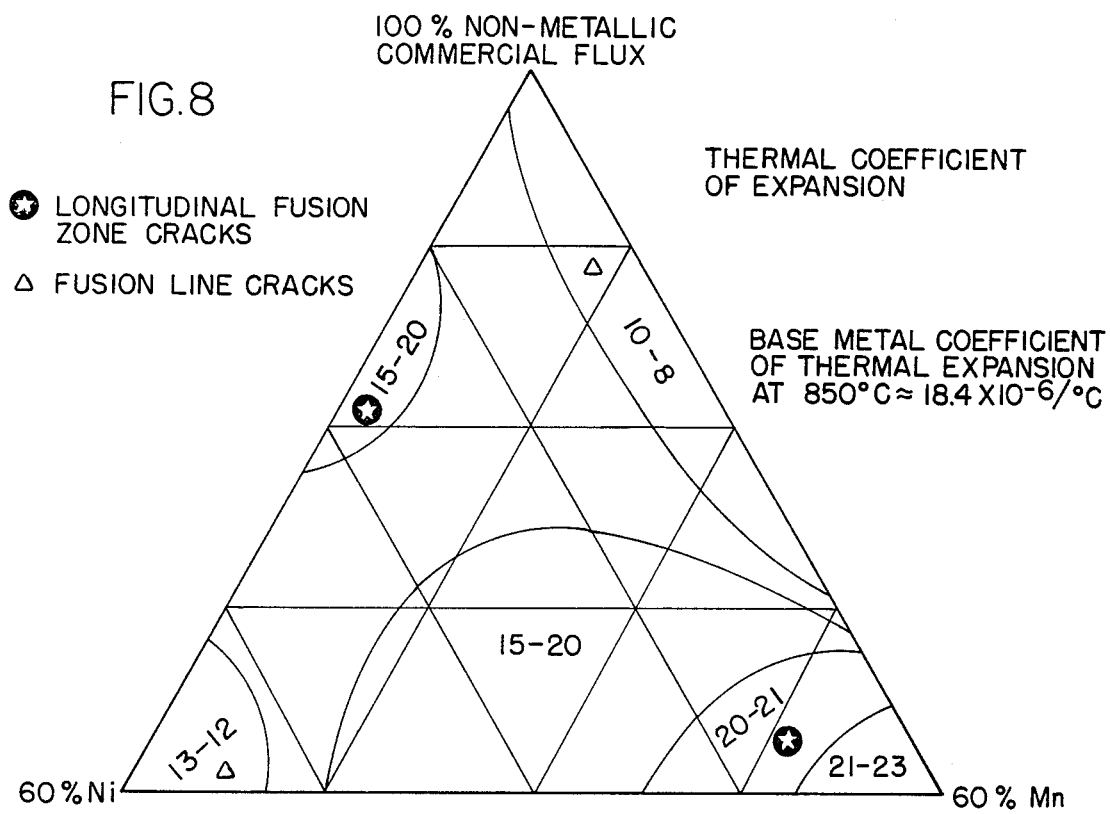
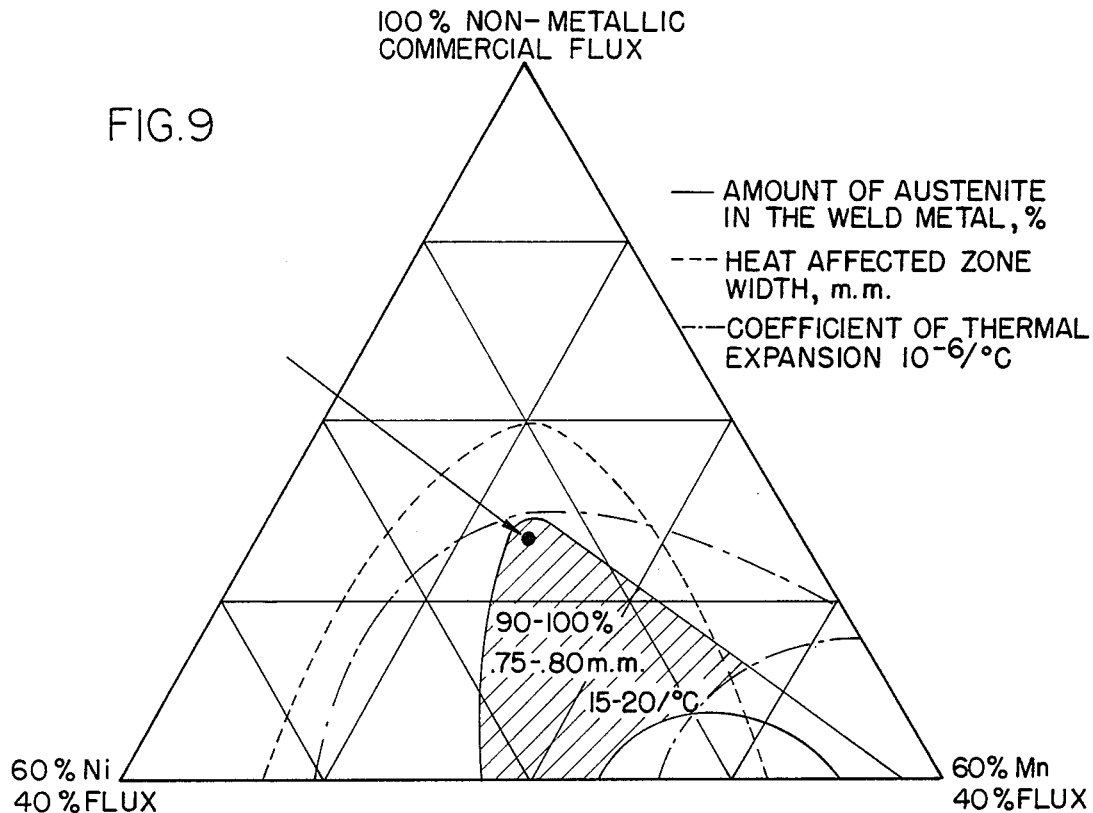

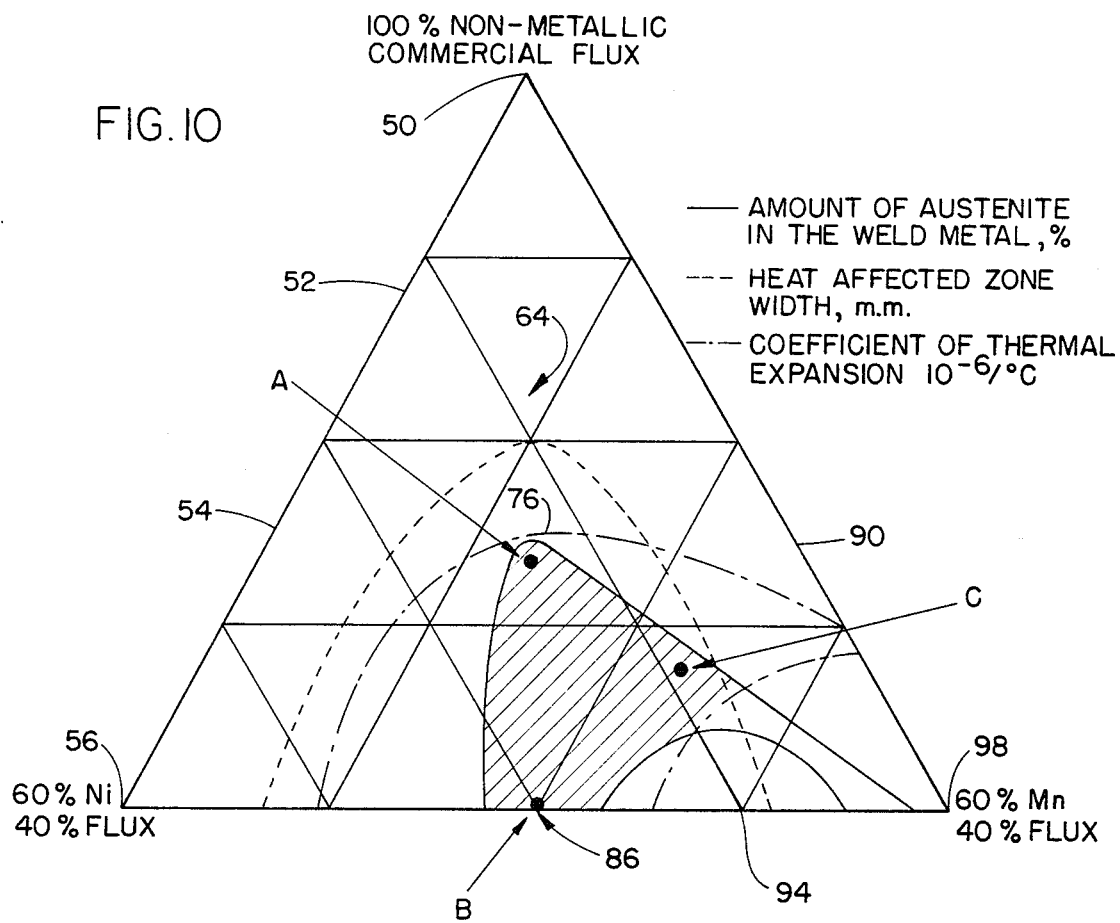

CAST IRON WELDING ELECTRODES

BACKGROUND OF THE INVENTION

The invention described herein was made in the course of a grant or award from the U.S. Army Research Office, an agency of the U.S. Government.

CROSS REFERENCE TO RELATED APPLICATIONS

This application is a continuation in part of U.S. Ser. No. 442,172 filed on Nov. 16, 1982, entitled "Cast Iron Welding Materials", now U.S. Pat. No. 4,534,793.

This invention relates to metallic filler compositions used for welding cast irons.

The cast irons are a family of iron alloys containing 1.8 to 4.5% carbon. The family includes gray iron (ca. 3.4% C), malleable iron (ca. 2.5% C), and ductile iron (ca. 3.4% C). The cast irons, especially ductile iron, possess many of the physical properties of steel, such as strength and toughness. These irons are increasingly being used to replace steel castings since they are cheaper and require less energy to produce. In order to realize their full potential, however, it is necessary to develop new and acceptable methods of welding cast iron parts.

PRIOR ART STATEMENT

Because of their high carbon content, two major problems arise in the fusion welding of cast irons: (a) the formation of massive carbides in regions of the parent metal that are melted or partially melted during the weld pass, and (b) the formation of martensite in regions of the parent metal that are heated to a temperature above the eutectiod but below the eutectic. Both carbide and martensite formation result in weld zones having properties different from those of the base metal. Thus, the weld zone may be lower in strength, lower in ductility, and most significantly, more brittle than the surrounding metal.

Two approaches to the fusion welding of cast irons have been used to achieve sound welds. In the first approach, nodular graphite is produced in the weld which resembles the graphite contained in the base metal. This is accomplished by adding graphitizing agents, such as silicon, and nodularizing agents, such as magnesium or rare earth metals, to the weld metal from the welding rod or flux. In this way, a weld metal is produced which has a microstructure, mechanical properties, and thermal expansion properties similar to those of the base metal.

In the second approach, nickel or copper is added as filler materials to the weld pool to produce an austenitic weld metal. The austenitic weld metal is tough, relatively soft, and exhibits other favorable properties. Satisfactory welds are produced by this approach because the eutectoid transformation to martensite is avoided and because of the ability of austenite to absorb carbon rejected by the melted cast iron, thus reducing the formation of carbides.

Nickel works successfully in this second approach because it is an austenite phase stabilizer. When present in austenite, it shifts the eutectoid point so as to suppress the transformation of austenite into pearlite. Nickel is therefore classified as an austenite former.

At present, nickel is typically introduced into the weld pool as an ingredient of the welding rods. Nickel-base covered electrodes are available for the arc welding of cast irons. These electrodes are classified as "pure" nickel, containing 90 to 95% Ni, nickel-iron, containing about 55% Ni, nickel-copper, containing about 60% Ni. The "pure" nickel and nickel-iron electrodes have emerged as the most satisfactory thus far for welding cast iron.

The use of nickel as filler material for welding cast iron presents several problems. First, nickel is expensive. Second, the thermal properties of nickel are significantly different from those of cast iron and give rise to thermal expansion mismatch between base metal and weld metal. This can result in stresses high enough to cause cracking. Third, phosphorus has low solubility in nickel. This too can result in cracking when nickel-base electrodes are used to weld irons high in phosphorus.

Accordingly, it is an object of the present invention to produce a filler material with substantially reduced nickel content for welding cast iron.

It is also an object of the present invention to reduce the mismatch between the thermal properties of the fusion zone and the base metal.

It is also an object of the present invention to produce a fusion zone of acceptable strength and toughness.

SUMMARY OF THE INVENTION

These and other objects are achieved by replacing nickel in the filler material with manganese. More specifically, it has been found that filler materials containing 15 to 50% manganese and 10 to 35% nickel provide acceptable cast iron weldments. A filler material containing 20% manganese and 20% nickel has been found to provide optimal results.

BRIEF DESCRIPTION OF THE DRAWINGS

FIG. 8 illustrates the average coefficient of thermal expansion of weld metal at 850° C. as a function of the manganese and nickel metal powder additions to a non-metallic commercial flux.

FIG. 9 illustrates a range of metallic powder and flux compositions which produce a desirable microstructure, width of the heat affected zone, and coefficient of thermal expansion in the welding of cast iron.

FIG. 10 is a composite figure illustrating the range of initial filler and flux compositions previously illustrated in FIG. 9, together with the resultant weld metal compositions resulting from said filler compositions in a submerged arc process.

DETAILED DESCRIPTION OF THE INVENTION

Figure 1:
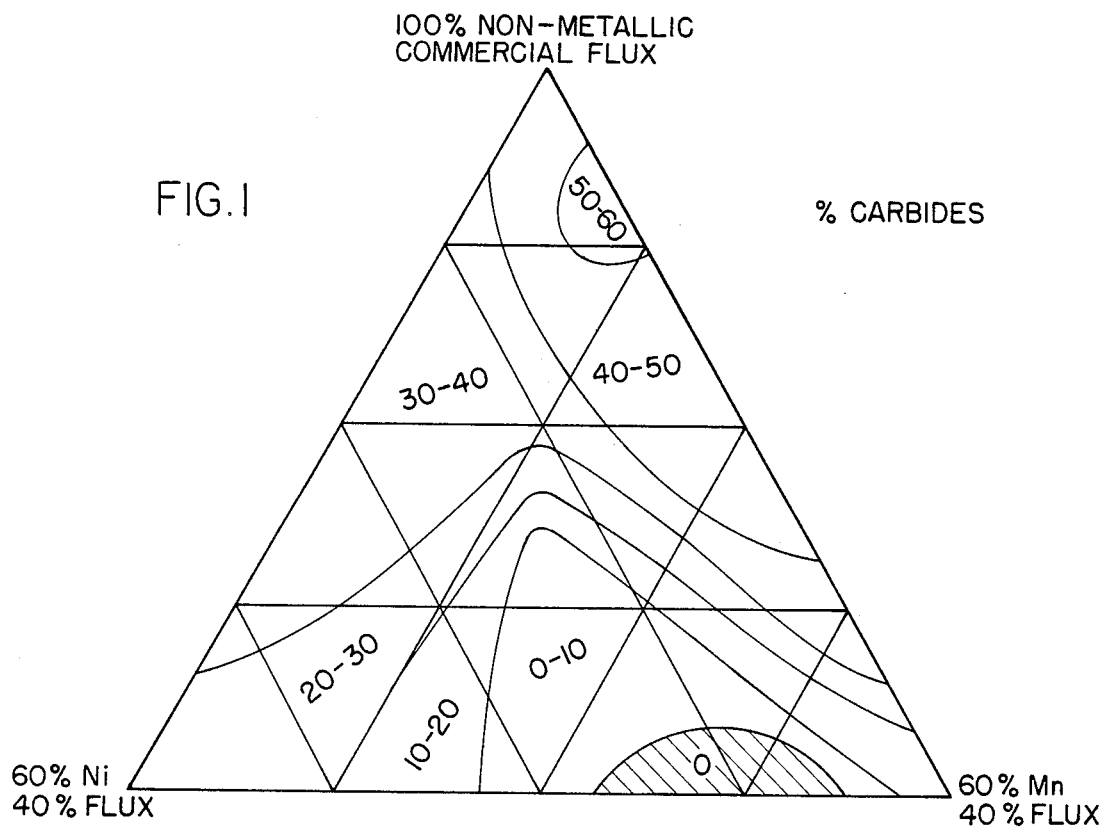
FIG. 1 illustrates the volume percent of carbides in the weld metal as a function of the manganese and nickel metal powder additions to a non-metallic commercial flux.

Manganese like nickel, acts as an austenite phase stabilizer and promotes formation of austenitic phase fusion zones. These zones absorb large amounts of carbon and other interstitial elements from melted cast iron. Carbide formation, and the brittleness associated with it, are thereby suppressed.

Among the advantages of replacing nickel with manganese are the following:

(a) Filler materials based on manganese-nickel alloys have a lower melting temperature than nickel-based alloys. Thus, less heat is required during welding. This results in savings and also decreases the cracking susceptibility in the partially melted region of the heat affected zone.

(b) Substantial manganese additions reduce the hardness of the fusion zone and achieve better mechanical properties than found with high nickel filler materials.

(c) Manganese-nickel filler materials achieve excellent thermal expansion compatibility with the base metal and better machinability than high nickel filler materials.

(d) Manganese is cheaper than nickel.

It has been demonstrated that 55% manganese metal powder additions to a neutral commercial submerged arc weld flux can produce lower fusion zone hardness in ductile iron weldments than found with iron-55% nickel filler metal wire. Metallic powder and flux compositions containing 10 to 35% nickel and 15 to 50% manganese provide even further improvements in cast iron weldment properties. For example, a mixture of 50% manganese and 10% nickel achieved the lowest weld hardness. It has also been shown that mixtures of manganese and nickel are better than either manganese or nickel alone for austenite stabilization. A filler composition containing 20% manganese metal powder, 20% nickel metal powder and flux was found to be optimal for reducing the propensity to crack, increasing machinability, and achieving the greatest economy.

The filler compositions of the present invention maybe used to weld cast iron to base metals made of either cast iron or other materials, such as steel, stainless steel, high nickel alloys.

All methods and processes which may be used to introduce filler materials to the weld pool are considered part of the present invention. The filler materials of the present invention may be added as part of the flux. Alternatively, the filler materials may be incorporated into a welding rod or wire. The filler materials may be coated onto or be contained within such welding rods and wires. The filler materials may be introduced into the weld pool through a combination of welding rod and flux additions.

The filler compositions of the present invention are useful for all methods of fusion welding cast iron. For example, the compositions may be used advantageously in the practice of submerged arc welding, gas metal arc welding shielded metal arc welding and flux cond metal arc welding. The compositions may also be used advantageously in the practice of gas welding, such as oxy-acetylene welding.

EXPERIMENTAL RESULTS

A series of tests were conducted to demonstrate the usefulness of the filler compositions within the scope of the present invention. These tests should not be construed as limiting the scope of the invention. Plates made of ductile iron containing 3.80% carbon were prepared for testing. Fifty 1000 gm flux samples were then prepared by mixing various amounts of 99.9% pure Mn and Ni powder (100 mesh average) with Hobart H-700 SAW flux. (hereinafter the non-metallic flux). This non-metallic flux is desirable to enhance arc stability, to control the bead morphology and to protect the weld pool and bead from oxidation. Typically, a non-metallic flux contains major percentages of $SiO_2$, MnO and CaO with smaller amounts of $CaF_2$, TiO, $Al_2O_3$ and MgO. The non-metallic fluxes may be enhanced for welding cast iron by adding thereto 5 to 10% by weight of graphite. While the graphite is not essential, it is desirable, particularly when welding bead on bead, without base metal dilution. The filler metal came from a Page Corporation type El-12$\frac{1}{8}$ diameter low carbon steel welding wire.

The compositions of the various samples prepared and treated are set forth in the following Table I:

TABLE I

| Flux No | Commercial Flux % | Commercial Flux grm | Manganese % | Manganese grm | Nickel % | Nickel grm |
|---|---|---|---|---|---|---|
| 50 | 100 | 1000 | — | — | — | — |
| 51 | 90 | 900 | — | — | 10 | 100 |
| 52 | 80 | 800 | — | — | 20 | 200 |
| 53 | 70 | 700 | — | — | 30 | 300 |
| 54 | 60 | 600 | — | — | 40 | 400 |
| 55 | 50 | 500 | — | — | 50 | 500 |
| 56 | 40 | 400 | — | — | 60 | 600 |
| 57 | 90 | 900 | 5 | 50 | 5 | 50 |
| 58 | 80 | 800 | 5 | 50 | 15 | 150 |
| 59 | 70 | 700 | 5 | 50 | 25 | 250 |
| 60 | 60 | 600 | 5 | 50 | 35 | 350 |
| 61 | 50 | 500 | 5 | 50 | 45 | 450 |
| 62 | 40 | 400 | 5 | 50 | 55 | 550 |
| 63 | 90 | 900 | 10 | 100 | — | — |
| 64 | 80 | 800 | 10 | 100 | 10 | 100 |
| 65 | 70 | 700 | 10 | 100 | 20 | 200 |
| 66 | 60 | 600 | 10 | 100 | 30 | 300 |
| 67 | 50 | 500 | 10 | 100 | 40 | 400 |
| 68 | 40 | 400 | 10 | 100 | 50 | 500 |
| 69 | 80 | 800 | 15 | 150 | 5 | 50 |
| 70 | 70 | 700 | 15 | 150 | 15 | 150 |
| 71 | 60 | 600 | 15 | 150 | 25 | 250 |
| 72 | 50 | 500 | 15 | 150 | 35 | 350 |
| 73 | 40 | 400 | 15 | 150 | 45 | 450 |
| 74 | 80 | 800 | 20 | 200 | — | — |
| 75 | 70 | 700 | 20 | 200 | 10 | 100 |
| 76 | 60 | 600 | 20 | 200 | 20 | 200 |
| 77 | 50 | 500 | 20 | 200 | 30 | 300 |
| 78 | 40 | 400 | 20 | 200 | 40 | 400 |
| 79 | 70 | 700 | 25 | 250 | 5 | 50 |
| 80 | 60 | 600 | 25 | 250 | 15 | 150 |
| 81 | 50 | 500 | 25 | 250 | 25 | 250 |
| 82 | 40 | 400 | 25 | 250 | 35 | 350 |
| 83 | 70 | 700 | 30 | 300 | — | — |
| 84 | 60 | 600 | 30 | 300 | 10 | 100 |
| 85 | 50 | 500 | 30 | 300 | 20 | 200 |
| 86 | 40 | 400 | 30 | 300 | 30 | 300 |
| 87 | 60 | 600 | 35 | 350 | 5 | 50 |
| 88 | 50 | 500 | 35 | 350 | 15 | 150 |
| 89 | 40 | 400 | 35 | 350 | 25 | 250 |
| 90 | 60 | 600 | 40 | 400 | — | — |
| 91 | 50 | 500 | 40 | 400 | 10 | 100 |
| 92 | 40 | 400 | 40 | 400 | 20 | 200 |
| 93 | 50 | 500 | 45 | 450 | 5 | 50 |
| 94 | 40 | 400 | 45 | 450 | 15 | 150 |
| 95 | 50 | 500 | 50 | 500 | — | — |

TABLE I-continued

| Flux | Commercial Flux | | Manganese | | Nickel | |
| --- | --- | --- | --- | --- | --- | --- |
| No | % | grm | % | grm | % | grm |
| 96 | 40 | 400 | 50 | 500 | 10 | 100 |
| 97 | 40 | 400 | 55 | 550 | 5 | 50 |
| 98 | 40 | 400 | 60 | 600 | — | — |

The tests were conducted with the submerged arc welding process which covers or submerges the weld zone with a layer of flux. A low carbon steel welding rod is then advanced through the flux to the weld zone to create the arc. The relative percentages of metal additives may be varied simply by mixing different percentages by weight of commercial flux, Ni powder and Mn powder. Thus a wide range of percentages of metal additives could be tested without having to cast rods with various metal additives. The term flux, as used hereinafter to describe the results of these tests, refers to the combined commercial flux and metal powders described in Table I above.

The welding parameters used in this investigation were selected to produce a constant heat input of 88 kilojules/inch. The welding voltage was 30 volts with a travel speed of 9.6 inches per minute, and the current was approximately 500 amperes. Using these parameters and the fluxes already described, single-pass bead-on-plate specimens were made on the pearlitic ductile iron base metal plate which has been ground prior to welding to remove any oxide scale. The weldments were made in the flat position using direct current reverse polarity. The specimens were allowed to cool to room temperature before the flux cover was removed. To investigate the temperature profiles produced by welding with some of these fluxes, ten thermocouples were placed at intervals across certain specimens.

Following the tests, selected samples were then analyzed to determine the metallurgical and chemical composition of the resulting weldment.

1. Effects of Manganese and Nickel on the Fusion Zone

Fifty weld specimens were prepared and microscopically examined to observe the effects of nickel and manganese powder additions to the welding fluxes on the microstructure and properties of the fusion zone.

FIG. 1 shows the volume percent of carbides in the fusion zone as a function of flux composition. With no manganese or nickel additions to the flux, the structure is carbides and very fine pearlite, as compared to the pearlite of the ductile iron base metal. The maximum amount of carbides in the fusion zone resulted with a 10% Mn powder addition to the flux. Small amounts of nickel in the flux are more effective than small amounts of manganese in reducing the amount of carbides, but for large additions this trend is reversed, as indicated by the close spacing of the lines on the lower part of the manganese side of this diagram. The smallest amount of carbides are found in the welds made with fluxes containing both manganese and nickel.

The reduction in amount of carbides causes a decrease in carbide continuity, and eventually carbide-free zones are produced in the flux composition range which is illustrated as cross-hatched in FIG. 1. Fluxes which produced fusion zones with discontinuous carbides occupy a larger range, lying roughly within the 0-10% carbide region.

Furthermore, micrographs of the samples suggest that the manganese additions are not only more effective than nickel in reducing amounts of carbides, but are also more effective in making the carbides discontinuous when comparable carbide content are considered carbide content and morphology is the strong effect on machinability. Machinability was simulated by drilling tests which were done on various fusion zone samples. These tests showed that, qualitatively, drilling was faster and easier as carbide contents and continuity decreased.

Figure 2:
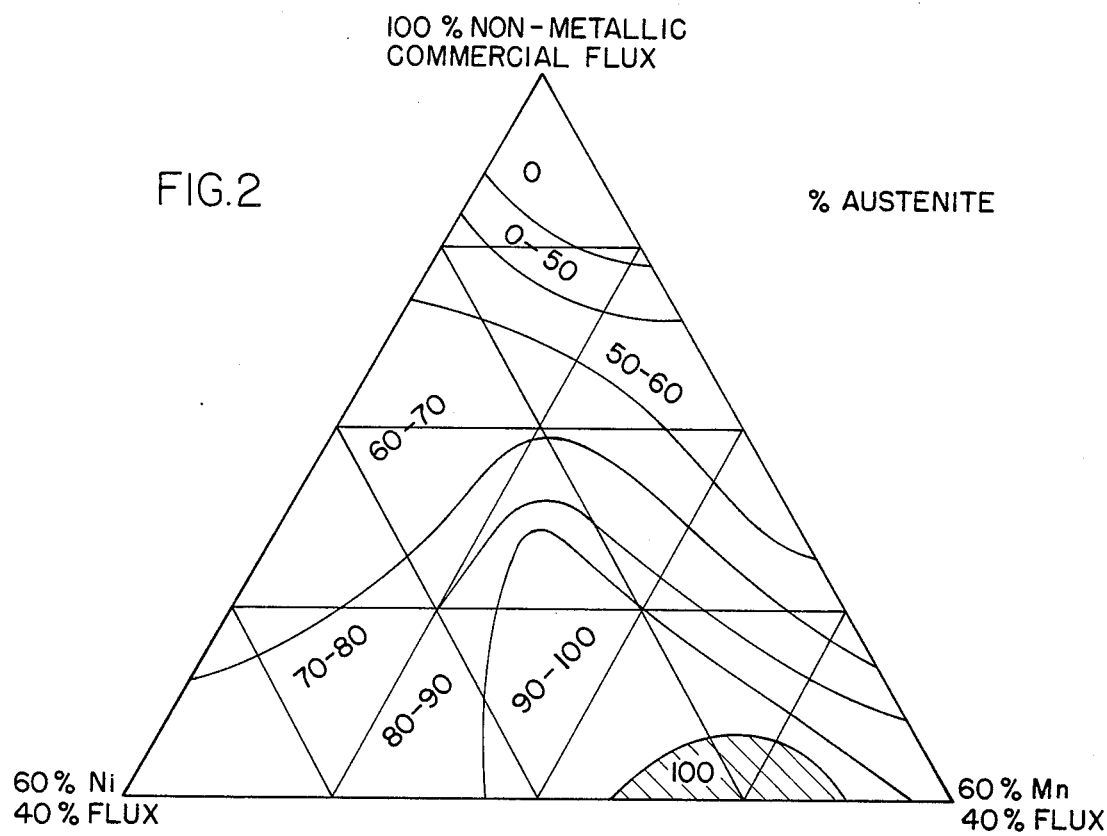
FIG. 2 illustrates the volume percent of austenite in the weld metal as a function of the manganese and nickel metal powder additions to a non-metallic commercial flux.

FIG. 2, which relates the amount of retained austenite in the weld metal to flux composition, shows some similarities to FIG. 1. The amount of retained austenite increases with the alloy content of the flux. Also, fusion zones produced with high alloy fluxes contain either austenite or carbide, so the lower section of the diagram illustrates that a decrease of carbides is accompanied by an equal increase in austenite. Therefore, the carbide-free zone in FIG. 1 is matched by a 100% austenite area in FIG. 2. However, this is not true in the low alloy regions where the microconstituents contain significant amounts of other microconstituents, such as pearlite and martensite.

Figure 3:
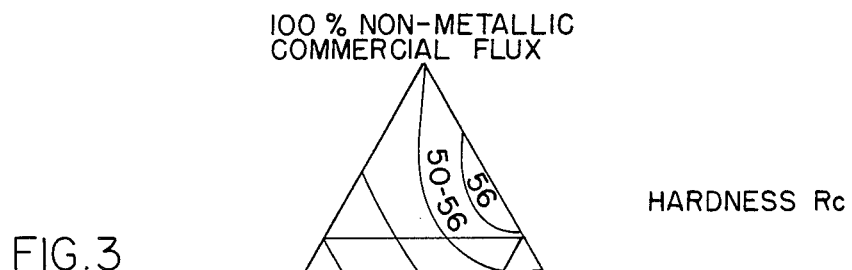
FIG. 3 illustrates the weld metal hardness as a function of the manganese and nickel metal powder additions to a non-metallic commercial flux.

Again, the relative effectiveness of manganese and nickel changes as total alloy content increases. Nickel is the more effective austenite stabilizer in low amounts, since at least 10% Ni in the fusion zone is needed to produce stable austenite; but FIG. 3 shows that manganese is more effective in large additions. The two figures also show that combinations of manganese and nickel are better than either manganese or nickel alone for austenite stabilization.

Fluxes containing small amounts of manganese produced more martensite than those with no alloy additions. This is probably due to the increase in hardenability provided by small amounts of manganese. In some low-alloy welds, hard nodules were found.

The graphitizing effect of nickel was evident from the micrographs which showed that graphite formed in the spaces between dendrites in a type D flake morphology. Residual amounts of nodularizing agents caused some spheres of graphite to form with the flakes. Type D graphite is damaging to mechanical integrity, and, all other things being equal, it would be better to produce no graphite by using Mn than to produce deleterious graphite with nickel. However, the graphite does help to reduce thermal expansion.

Since hardness is strongly influenced by microstructure, FIG. 3 is very similar to FIG. 2 and even more so to FIG. 1. The isolated regions of high hardness are caused by the tendency toward increased hardenability and carbide formation when small amounts of manganese are used. Conversely, the region of very low hardness at the bottom of FIG. 3 is caused by the lack of carbides in the samples. Between these two extremes, the fusion zone hardness decreases as the amount of carbide is reduced by increasing alloy additions. The higher hardness values of samples in which nickel is the main alloy element may be caused in part by the greater continuity of the carbide networks in these samples, as discussed above.

2. Effects of Manganese and Nickel on the Heat Affected Zone

One problem which is common to both filler metal approaches is that as the base metal is heated above the eutectoid temperature, the dissolution of the graphite spheroids increases the carbon content of the surrounding matrix in the heat-affected zone. Upon cooling, this carbon-enriched matrix may transform to produce carbides and martensite. This concern over continuous carbide formation in the heat affected zone (HAZ) suggests using welding procedures with low heat input.

Figure 4:
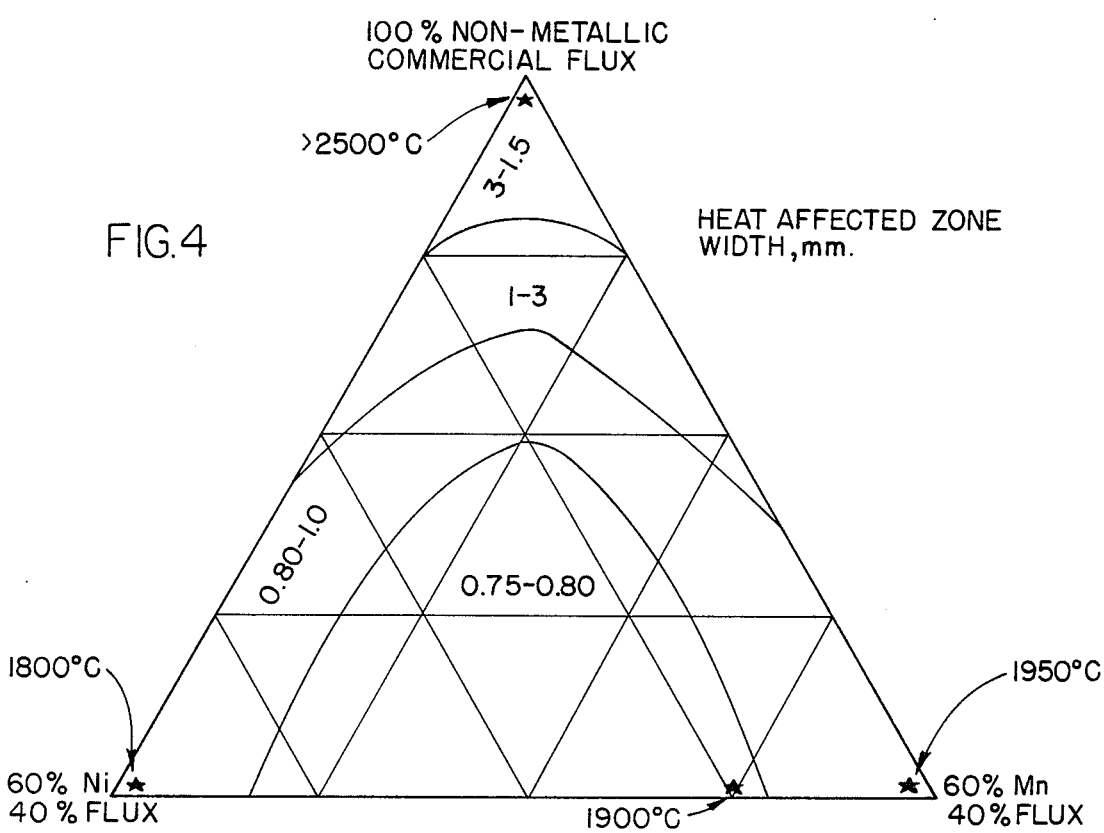
FIG. 4 illustrates the width of the heat affected zone and indirectly the temperature of the weld pool as a function of the manganese and nickel metal powder additions to a non-metallic commercial flux.

The heat affected zone varied significantly with flux composition, as shown in FIG. 4. Also shown in this figure are the best estimates of the temperatures of the weld pools produced by these fluxes. As indicated, the HAZ widths show no completely consistent correlation with the pool temperatures.

Figure 5:
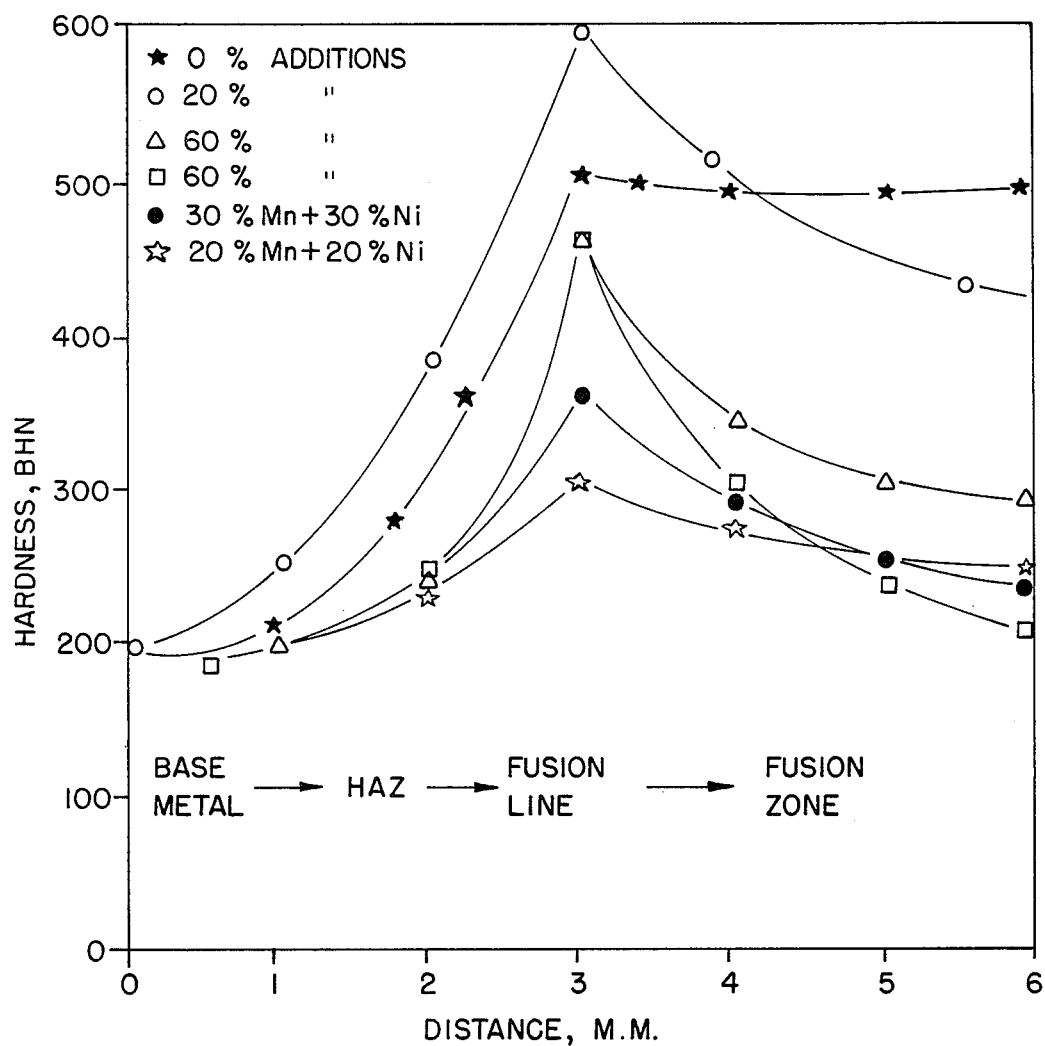
FIG. 5 graphically illustrates the hardness profile of the weldments as a function of the manganese and nickel content in the flux.

The hardness profiles in FIG. 5 show large variations in peak fusion line hardness as the flux compositions change. These variations may be influenced by the maximum fusion zone temperature, but the hardenability and austenite stabilizing effects of the alloy additions were probably more significant in causing the variations. Flux composition also had a strong influence on fusion zone hardness as discussed earlier.

By comparing FIG. 5 with micrographs, it is seen that the changes in peak hardness reflect vastly different fusion line and HAZ microstructures for different filler compositions. Fusion lines resulting from 30% Mn -30% Ni and 20% Mn - 20% Ni fluxes are narrow and relatively soft. The lack of carbides in these fusion lines suggests that the fusion zone solidified below the base metal eutectic temperature; conversely, the large amount of carbides in the fusion zone which solidified at a temperature much higher than that of the base metal eutectic. The hardest HAZ, made with 20% Mn flux, had this same type of microstructure. Heat affected zones intermediate in carbide content and carbide continuity result when the fusion zone melting point is slightly above the base metal eutectic.

Sequential micrographs demonstrate many of the fusion line and heat affected zone concepts discussed previously. Away from the fusion zone, the maximum local base metal temperature is not high enough to effect any phase transformations and the base metal is virtually unchanged. Moving toward the fusion zone, and thus toward higher maximum temperatures, the unaffected base metal gives way to HAZ. In this region, temperatures between the eutectoid and eutectic range are reached. Diffusion of carbon from the graphite nodules into the surrounding austenite and the subsequent austenite transformation upon cooling give rise to a variety of microstructures in the HAZ. In low-temperature regions, carbon diffuses away from the nodules during heating and back toward the nodules during cooling. This leaves a band of high-carbon austenite which transforms to make a ring of pearlite colonies within the ferrite ring. Higher temperature regions contain martensite because the more extensive diffusion of carbon produced a higher-carbon austenite, and because the higher cooling rates in these regions suppressed the pearlite reaction.

Where temperatures are high enough to be in the liquid plus austenite ranges, incipient melting occurs. The nodules partially decompose in the eutectic reaction to produce a shell of high-carbon liquid. This liquid transforms to austenite plus carbide because of the high cooling rates. Bordering on the fusion zone, the carbide shells connect to each other or open into the fusion zone to form fusion lines of various morphologies. Finally, the fusion zone is reached, and consists of austenite and carbides in amounts determined by the fusion zone composition.

3. Effects of Manganese and Nickel On The Coefficient of Thermal Expansion

Figure 6:
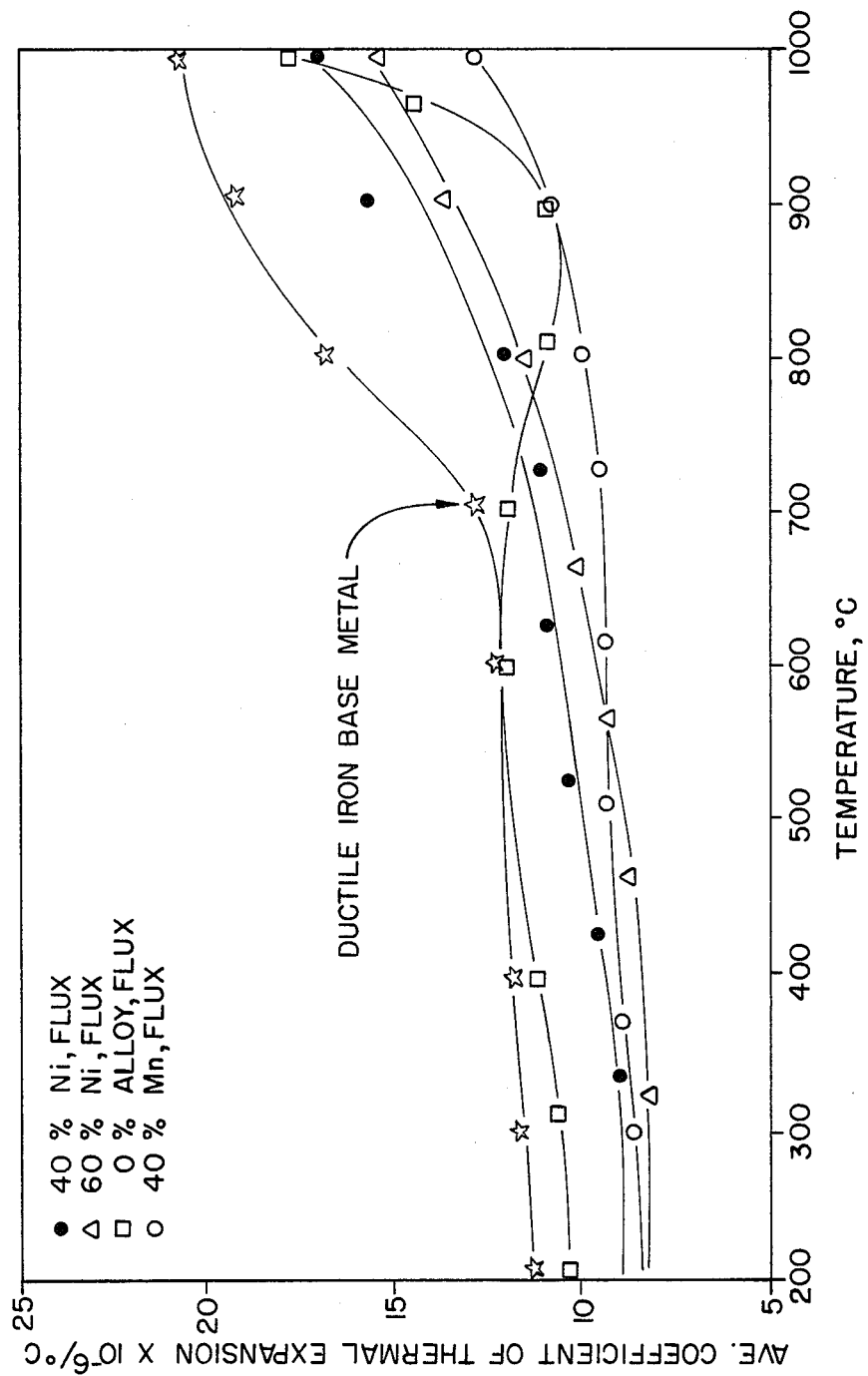
FIG. 6 graphically illustrates the average coefficient of thermal expansion as a function of the temperature of weld metal made with manganese-nickel filler compositions.
Figure 7:
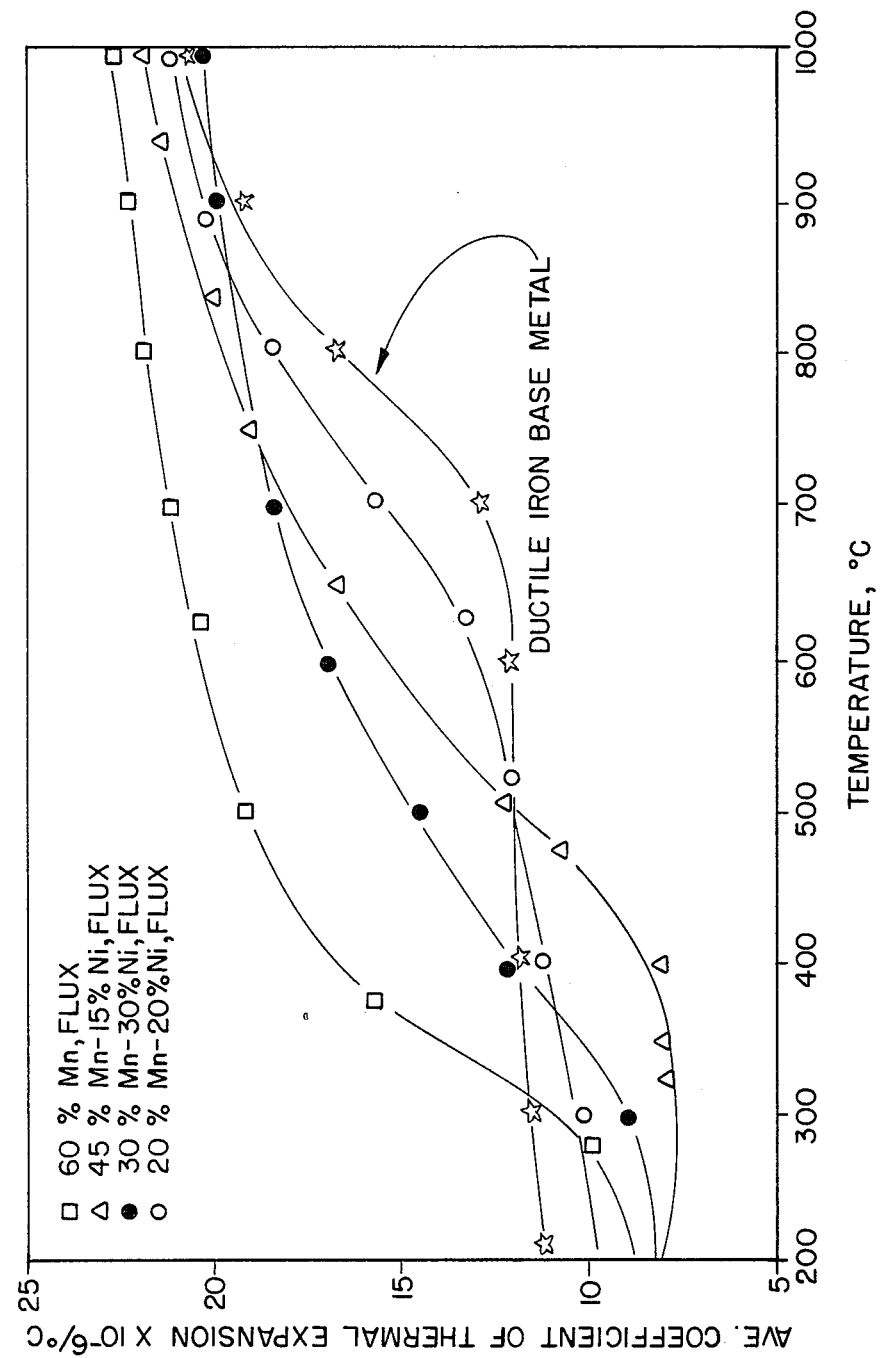
FIG. 7 also graphically illustrates the average coefficient of thermal expansion as a function of the temperature of weld metal made with manganese-nickel filler compositions.

The average coefficient of thermal expansion was measured as a function of temperature for selected samples, and the results are plotted in FIGS. 6 and 7. The curves for base metal and welds with no flux additions show changes in slope due to the pearlite to austenite transformation. As shown, the 60% Ni flux produces welds with lower coefficients of thermal expansions than that of the base metal, while welds made with 60% Mn flux have larger coefficients of thermal expansion ($\alpha$). Large amounts of carbides in the weld, as in the 40% Mn sample, reduce the coefficient of thermal expansion.

The effects of flux composition on thermal expansion are presented in a more general way in FIG. 8 which shows the value of $\alpha$ at 850° C. Also shown, are symbols which indicate the types of cracking found in each zone of $\alpha$ values. As a rule, the welds with high value of showed longitudinal fusion zone cracks because of residual tensile stresses in the bead. On the other hand, welds with very low values of thermal expansion tend to develop compressive stresses on the bead, which can result in fusion line cracks at the very bottom of the fusion zone.

By showing the general trends in $\alpha$, FIG. 8 suggests ways of optimizing the flux composition. To reduce cracking tendencies, the coefficient of expansion of the fusion zone should match that of the base metal ($18.4 \times 10^{-6}$/°C. at 850° C.). By reducing the nickel content of fluxes containing only nickel, $\alpha$ increases towards the value for the base metal. At the same time, however, excessive amounts of carbide cause hardness and machinability problems. Similarly, reducing the manganese content of fluxes with only manganese will cause $\alpha$ to decrease towards the value for the base metal, but excessive carbides would again cause problems. Suitable values of $\alpha$ and acceptable hardness can be produced with certain fluxes along the 60% total alloy line. Satisfactory results may also be obtained using similar alloy additions when the flux composition is near the 20% Mn-20% Ni point.

4. Chemical Analysis of the Fusion Zone

Several samples were chemically analyzed to determine fusion zone composition. The following Table II lists the samples that were chemically analyzed. FIG. 10 correlates the chemical composition of the resulting weldment with its metallurgical properties as previously described with respect to FIGS. 1–4 and 8–9. The sample points illustrate that the resulting weldment has a different chemical composition than the initial flux composition used to create the weldment. These differences are due primarily to differences in Ni and Mn recovery rates and dilution from the base metal and filler rod. From this, the recovery of the alloy elements from the flux was calculated. It was found that the recovery of nickel was high than that of manganese. On the average, the recovery of manganese was 64% and the recovery of nickel was 83%. This recovery is a combination figure that includes both additive consumption and base metal dilution. The chemical analysis and recovery for each sample are presented in Table II.

TABLE II

| Sample Point | Flux Composition Mn—Ni | % Mn in Fusion Zone | % Ni in Fusion Zone | % C in Fusion Zone | % Mn Recovered | % Ni Recovered |
|---|---|---|---|---|---|---|
| 50 | 0%—0% | 1.22 | 0.05 | 2.06 | — | — |
| 52 | 0%—20% | — | 12.6 | 2.83 | — | 63 |
| 54 | 0%—40% | — | 23.3 | 1.90 | — | 58 |
| 56 | 0%—60% | — | 39.4 | 1.80 | — | 66 |
| 64 | 10%—10% | 6.2 | 9.6 | 1.80 | 62 | 96 |

TABLE II-continued

| Sample Point | Flux Composition Mn—Ni | % Mn in Fusion Zone | % Ni in Fusion Zone | % C in Fusion Zone | % Mn Recovered | % Ni Recovered |
|---|---|---|---|---|---|---|
| 76 | 20%—20% | 13.1 | 15.9 | 1.12 | 66 | 80 |
| 86 | 30%—30% | 20.2 | 34.3 | 1.21 | 67 | 114 |
| 74 | 20%—0% | 13.4 | — | 2.10 | 67 | — |
| 90 | 40%—0% | 18.0 | — | 2.15 | 45 | — |
| 98 | 60%—0% | 50.9 | — | 0.26 | 85 | — |
| 73 | 15%—45% | 3.6 | 21.4 | 1.56 | 24 | 48 |
| 94 | 45%—15% | 43.1 | 20.7 | 0.12 | 96 | 138 |

It will be observed that carbon is absorbed into the fusion zone from the base metal. In almost all cases, the fusion zone contained more than 1% carbon.

Knowing the fusion zone composition allows determination of the composition of welding rods and wires which would give the same results as the alloyed fluxes. It should be mentioned that the low recovery of manganese and nickel in some cases, present no real practical problems, since this type of recovery is not encountered in other wire processes which are more suitable than the submerged arc welding process for most production welding of cast iron.

5. Optimizing the Weld Metal Composition

The determination of an optimum fusion zone composition was based on considerations of reducing cracking propensity, increasing machinability, and achieving economy. Fusion line cracking is aggravated by the presence of continuous carbides and the hard fusion lines which they create. Fusion zone cracking can be caused by excessive amounts of continuous carbide and by thermal expansion mismatch, which also can initiate fusion line cracks. Cracking problems, then, can best be avoided by producing welds with carbide-free fusion lines, soft fusion zones with discontinuous carbides, and coefficients of thermal expansion which match that of the base metal. Machinability also is increased when the fusion lines are soft and when the fusion zone has small amounts of discontinuous carbides in a soft austenite matrix. The best economy is achieved by reducing total alloy content and by substituting manganese for nickel.

The discussion of fusion zone microstructure, heat affected zone width, and thermal expansion have shown that the least cracking and best machinability will be found in welds with at least 90% austenite, the narrowest heat affected zone (0.75–00.80 mm), and a thermal expansion coefficient of about $18.4 \times 10^{-6}/°C$. at 850° C. The ranges of flux compositions which produce each of these desirable properties are shown in FIG. 9.

The area common to these separate ranges is the range of filler compositions which produce the soundest welds. This area relating to the soundest welds is also shown as the cross-hatched area of FIG. 10. Also shown in FIG. 10 is the point A representing a weldment formed with a flux having a 20% Mn-20% Ni composition. This composition would result in a weld metal which is about 90% austenite and only 10% carbides, has a heat affected zone of about 0.75 mm, and has a coefficient of thermal expansion of about $19.3 \times 10^{-6}/°C$. at 850° C. A second point B, and a third point C describe a triangle within the cross hatched area that defines the preferred metallurgical structure and chemical composition of the resulting weldments. When economy is taken into account, the 20% Mn-20% Ni composition is optimal, though higher alloy compositions could be useful in some specific applications, for example, when dilution is very high.

6. Application to Other Welding Processes

The results of the foregoing experiment indicate the invention is applicable to a wide range of welding processes and techniques. The selection of the preferred composition of the welding rod or welding wire for various other processes may be back calculated, taking into account the amount of expected additive consumption and base metal dilution that would result from the process and welding heat input selected.

For example, the invention is believed to be particularly applicable to both the submerged arc (SA) and Flux Cored Arc (FCA) processes wherein the Ni and Mn additives would be added or mixed with the non-metallic flux. Alternately, the Ni and Mn additive would be alloyed with the Fe in the welding wire or rod for use in the Shielded Metal Arc (SMA) (known in Europe as manual metal arc welding) or Gas Metal Arc (GMA) processes. Each of these welding techniques is well known to those skilled in the art, and are described in standard reference materials used in the art. The following table lists the pages of each of two reference works wherein the foregoing processes are described.

*AWS Handbook*, Volume 2, 7th Edition, (Published by the American Welding Society, Miami, Fla.).

|  | Pages |
|---|---|
| Shielded Metal Arc Welding (SMA) | 43–76 |
| Gas Metal Arc Welding (GMA) | 113–152 |
| Flux Cored Arc Welding (FCA) | 153–187 |
| Submerged Arc Welding (SA) | 189–223 |

*ASM Handbook*, Volume 6, 9th Edition, (Published by the American Society for Metals, Metal Park, Ohio 44073).

|  | Pages |
|---|---|
| Shielded Metal Arc Welding (SMA) | 76–95 |
| Gas Metal Arc Welding (GMA) | 153–213 |
| Flux Cored Arc Welding (FCA) | 96–113 |
| Submerged Arc Welding (SA) | 114–152 |

The foregoing pages of these references are incorporate herein by reference thereto.

As noted above in Table II, the recovery of Mn in the resulting weldment averaged 64% while the recovery of Ni in the weldment was 83%. These recovery rates are a combination of metal additive consumption and base metal dilution. These recovery rates are lower than would be encountered in commercial practice for two reasons. First, the addition of Mn as a fine sieve metal powder induces high oxide losses as the Mn is evaporated and consumed in the arc. Secondly, the relative amount of heat used in the test was relatively high, at 88 kilojoules/inch.

Typically, a much lower consumption rate would be found in the metal powder additive when used in the Flux Cored Arc welding process. When the Mn and Ni is alloyed in the rod, the recovery (from additive consumption) would be much higher, ranging from 75 to 85% for Mn and 90–95% for Ni. These recovery figures would be typical of the Shielded Metal Arc (SMA) and Gas Metal Arc (GMA) welding processes.

In addition to the recovery rate, the base metal dilution must also be considered. This is the dilution of the resulting weldment by melted base metal entering the weld pool. Dilution is primarily a function of heat input, but varies some what with various welding techniques. The Submerged Arc welding process would have the highest dilution ranging from 25 to 40% with the Flux Cored Arc (FCA) welding process the lowest, averaging from 10–25%. The two alloy wire or rod processes, SMA and GMA, would run from 15 to 30%.

While the preferred width of the heat affected zone described in FIGS. 4, 9 and 10 is not one of the defining curves for the cross-hatched areas of FIGS. 9 or 10, it is desirable, as a matter of practice in welding cast iron, to keep this zone as small as possible and to use the minimum heat input necessary to achieve a true weld.

The heat input is measured in Joules or kilojoules per inch or per mm, wherein $$H_1 = (VI/S)$$

where $H_1$ is heat input, V is volts, I is amperage and S is weld speed in inches-per-minute or mm-per-second. The tests of the present invention were conducted at 88 kilojoules per inch to insure adequate alloying of the weldment with the metal powder additives. It is preferable, however, to weld cast iron with a lower heat input, which may be as low as 20 to 25 kilojoules per inch for a commercial welding process using an alloyed electrode.

To determine the range of compositions desirable in each of the foregoing processes to achieve the preferred weldment described in FIG. 10, one must then consider, for each welding process, the recovery and dilution to be expected.

For example, in the Shielded Metal Arc welding process, the metal additive would be alloyed in the welding rod. The preferred range of weld metal composition at points A, B and C illustrated in FIG. 10, one first adjusts for the expected recovery (addition consumption) rates of 75% for Mn and 95% for Ni (typical of SMA welding process). The resultant intermediate number is then adjusted for base metal dilution to derive the desired composition of the consumable welding rod. These calculations for SMA welding process are

| Points | Weld Metal Composition* | | | Adjusted for Recovery | | Adjusted for Max Dilution 30% | |
|---|---|---|---|---|---|---|---|
| | Ni | Mn | C | Ni | Mn | Ni | Mn |
| A | 16 | 13 | 1.1 | 17 | 17 | 25% | 25% |
| B | 34 | 20 | 1.2 | 36 | 27 | 51% | 30% |
| C | 17 | 19 | 1.7 | 18 | 25 | 26% | 36% |

*balance substantially Fe. All compositions are in weight percent.

The carbon referred to above typically was from the base metal, which may run as high as 3.5% for gray and ductile cast iron. Alternately 5–10% graphite may be added to the non-metallic flux surrounding the consumable to supply the C for the weld pool. This would be particularly desirable for weld deposits (refacing) wherein beads are laid upon beads without base metal dilution. The above table is an arithmetic projection based on standard recovery and dilution values. As a formulating range, the alloy steel core should consist of 17–50% Ni, 20–40% Mn, with the balance substantially Fe.

The calculations for the consumable product to be used for Gas Metal Arc welding are essentially the same as for SMA since the recovery percentages and dilution percentages are essentially the same. The wire electrode, however, is not coated with a flux, since the gas supplied during the welding process inhibits the formation of oxides. It is therefore desirable to add C to the consumable electrode to achieve approximately 1.5% C in the alloy. The preferred range for compositions of the alloyed wire electrode used for Gas Metal Arc welding would therefore be 20 to 50% Ni, 20 to 40% Mn, 1.5% C and the balance substantially Fe. This welding electrode would produce weld deposits within the cross-hatched area of FIG. 10. The preferred composition from an economic point of view would be the alloy at point A since it requires less alloying elements that other ranges in FIG. 10.

The calculations of the outside range of compositions suitable for Flux Cored Arc welding electrodes are somewhat more variable because Mn powder consumption increases as heat input increases. Dilution, however, is lower (10–25%) with the FCA welding process then with other processes. The preferred range, however, may be calculated in a similar manner. With reference again to the weld metal compositions delivered in FIG. 10:

| Points | Weld Metal Composition | | | Adjusted for Recovery | | Adjusted for Max Dilution | |
|---|---|---|---|---|---|---|---|
| | Ni | Mn | C | Ni | Mn | Ni | Mn |
| A | 16 | 13 | 1.1 | 17 | 17 | 23% | 23% |
| B | 34 | 20 | 1.2 | 36 | 27 | 48% | 36% |
| C | 17 | 19 | 1.7 | 18 | 25 | 24% | 33% |

In the preferred method for using the flux cored rod, the metal Mn and Fe powders are mixed with non-metallic flux and 5–10% graphite powder. This flux core is surrounded by a hollow steel electrode. The above table is an arithmetic projection based on standard recovery and dilution values. As a formulating range, the metal powder should consist of 15–35% Ni and 15–30% Mn, with the balance of the composition a non-metallic welding flux.

The section on chemical analysis showed that the 20% Mn-20% Ni flux produces a fusion zone with 13.1% Mn and 15.9% Ni. The wire composition needed to produce an equivalent weld will vary according to the amount of dilution by the base metal; but for 30% dilution, which is typical of submerged arc and gas metal arc welding processes, the wire would have to contain 18.7% Mn and 22.7% Ni. For simplicity this wire composition of 60% Fe, 20% Ni and 20% Mn is called 20-20 casting filler metal. This is substantial reduction of both Ni and total alloy content from the 55 Ni rod commonly used at present, which contains at least 50% Ni.

While the invention has been described by referring to specific embodiments, it should be obvious to one of ordinary skill in the art that many variations can be made without departing from the scope of the present invention.

What is claimed is:

1. A welding electrode for use in the shielded metal arc welding of cast iron, said electrode having an alloyed steel core consisting essentially of 17–50% Ni, 20–40% Mn, with the balance substantially Fe, said rod when used in welding cast iron forming a weldment having a plurality of metalurgical properties, said properties being defined by the cross hatched area of FIG. 10.

2. A welding electrode, for use in the shielded metal arc welding of cast iron, said electrode having an alloyed steel core consisting essentially 17–50% Ni, 20 to 40% Mn with the balance substantially Fe, said rod, when used in welding cast iron having a plurality of metallurgical properties as delineated by the cross hatched area of FIG. 10, with 1-10% of the weld metal matrix formed as discontinuous carbides.

3. A welding electrode for use in the shielded metal arc welding of cast iron as claimed in claims 2 or 1, wherein said alloyed steel core consists essentially of 20-25% Mn, with the balance substantially Fe.

4. A welding electrode for use in the shielded metal arc welding of cast iron as claimed in claims 2 or 1, wherein said alloyed steel consists essentially of 20% Ni, 20% Mn, with the balance substantially Fe.

5. A welding electrode for use in the shielded metal arc welding of cast iron as claimed in claims 2 or 1 wherein said electrode is coated with a non-metallic welding flux which includes 5 to 10% graphite.

6. A welding electrode for use in the flux core arc welding of cast iron, said electrode having a tubular steel electrode, said tubular portion filled with a composition consisting essentially of 15-35% Ni powder, 15-30% Mn powder, and balance, a non-metallic welding flux, said tubular steel electrode and said composition having a total manganese content for the combination as a whole of 15-30% Mn by weight, and when used in welding cast iron, forming a weldment having a plurality of metallurgical properties, said properties being defined by the cross hatched area of FIG. 10.

7. A welding electrode for use in the flux cored arc welding of case iron, said electrode having a tubular steel electrode, with said tubular portion filled with a composition consisting essentially of 15-35% Ni powder, 15-30% Mn powder and the balance, a non-metallic welding flux, said electrode and said composition together consisting essentially of a total metallic composition as a whole of 15-35% Ni, 15-30% Mn with the balance substantially Fe, said rod, when used in welding cast iron forming a cast iron weldment having a plurality of metallurgical properties as delineated by the cross hatched area of FIG. 10, with 1-10% of the weld metal matrix formed as continuous carbides.

8. A welding electrode for use in the flux cored arc welding a cast iron as claimed in claims 7 or 6, wherein said tubular portion is filled with a composition consisting essentially of 20% Ni powder, 20% Mn powder and the balance, a non-metallic welding flux.

9. A welding electrode for use in the flux cored arc welding of cast iron, as claimed in claims 7 or 6 wherein said non-metallic flux contains 5-10 graphite.

* * * * *

UNITED STATES PATENT AND TRADEMARK OFFICE
CERTIFICATE OF CORRECTION

PATENT NO. : 4,726,854

DATED : February 23, 1988

INVENTOR(S) : David L. Olson, et al.

It is certified that error appears in the above-identified patent and that said Letters Patent is hereby corrected as shown below:

Column 1, line 35: "eutectiod" should read as --eutectoid--

Column 5, line 23: "kilojules" should read as --kilojoules--

Column 6, line 1: "when comparable carbide content are considered carbide content and morphology" should read as --when comparable amounts of carbide content are considered. The carbide content and morphology--

Column 8, line 15: "high value of showed longitudinal" should read as --high value of thermal expansion showed longitudinal--

Column 8, line 53: "high" should read as --higher--

Column 12, line 11: "that" should read as --than--

UNITED STATES PATENT AND TRADEMARK OFFICE
CERTIFICATE OF CORRECTION

PATENT NO. : 4,726,854

DATED : February 23, 1988

INVENTOR(S) : David L. Olson, et al.

It is certified that error appears in the above-identified patent and that said Letters Patent is hereby corrected as shown below:

Column 12, line 17: "then" should read as --than--

Column 14, line 18, Claim 8" "welding a cast iron" should read as --welding of cast iron--

Column 14, line 24, Claim 9: "contains 5-10 graphite" should read as --contains 5-10% graphite--

Signed and Sealed this

Tenth Day of January, 1989

*Attest:*

DONALD J. QUIGG

*Attesting Officer*  *Commissioner of Patents and Trademarks*